(12) United States Patent
Johnson

(10) Patent No.: US 10,841,047 B2
(45) Date of Patent: *Nov. 17, 2020

(54) METHODS AND SYSTEMS FOR RELIABLE BROADCASTING USING RE-TRANSMISSIONS

(71) Applicant: TrellisWare Technologies, Inc., San Diego, CA (US)

(72) Inventor: Mark Johnson, San Diego, CA (US)

(73) Assignee: TRELLISWARE TECHNOLOGIES, INC., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/154,592

(22) Filed: Oct. 8, 2018

(65) Prior Publication Data

US 2019/0044661 A1    Feb. 7, 2019

Related U.S. Application Data

(63) Continuation of application No. 15/288,808, filed on Oct. 7, 2016, now Pat. No. 10,097,318.

(51) Int. Cl.

| | |
|---|---|
| *H04L 1/18* | (2006.01) |
| *H04L 12/721* | (2013.01) |
| *H04L 12/733* | (2013.01) |
| *H04L 12/26* | (2006.01) |
| *H04L 1/00* | (2006.01) |

(52) U.S. Cl.
CPC .......... *H04L 1/189* (2013.01); *H04L 1/1887* (2013.01); *H04L 43/0829* (2013.01); *H04L 43/0847* (2013.01); *H04L 45/14* (2013.01); *H04L 45/20* (2013.01); *H04L 2001/0093* (2013.01)

(58) Field of Classification Search
None
See application file for complete search history.

(56) References Cited

U.S. PATENT DOCUMENTS

| | | |
|---|---|---|
| 2004/0143842 A1 | 7/2004 | Joshi |
| 2005/0180356 A1 | 8/2005 | Gillies et al. |
| 2006/0215593 A1 | 9/2006 | Wang et al. |
| 2007/0258466 A1 | 11/2007 | Kakani |
| 2008/0019328 A1 | 1/2008 | Rudnick |
| 2009/0073921 A1 | 3/2009 | Ji et al. |

(Continued)

OTHER PUBLICATIONS

Combined Search Report and Written Opinion in International Application No. PCT/US17/51111, dated Nov. 27, 2017.

(Continued)

*Primary Examiner* — Saba Tsegaye
(74) *Attorney, Agent, or Firm* — Perkins Coie LLP

(57) ABSTRACT

Methods and systems for reliable broadcasting that use re-transmissions, in a multi-hop, time-slotted wireless network, is presented. The methods and systems evaluate the trade-off between power consumption and communication reliability, and are consequently able to provide increasing degrees of robustness for broadcasts in the wireless network. Embodiments of the present invention are able to incrementally use re-transmissions, therein trading-off battery life for an increased message completion rate or a lower packet error rate, for example, in order to reliably broadcast critical or high-priority message network-wide.

17 Claims, 15 Drawing Sheets

(56) References Cited

U.S. PATENT DOCUMENTS

| | | | |
|---|---|---|---|
| 2009/0252142 A1* | 10/2009 | Horio | H04L 1/02 370/343 |
| 2011/0053495 A1* | 3/2011 | Hara | H04B 7/15542 455/7 |
| 2013/0315078 A1 | 11/2013 | Brown et al. | |
| 2014/0226699 A1* | 8/2014 | Kim | H04B 7/15 375/211 |
| 2015/0023213 A1 | 1/2015 | Soneda et al. | |
| 2016/0081024 A1 | 3/2016 | Gokturk et al. | |
| 2016/0135242 A1* | 5/2016 | Hampel | H04W 40/02 370/329 |
| 2016/0191181 A1 | 6/2016 | Bailey | |
| 2016/0219024 A1 | 7/2016 | Verzun et al. | |
| 2017/0317906 A1 | 11/2017 | Tsai et al. | |
| 2018/0035374 A1* | 2/2018 | Borden | H04W 52/0229 |

OTHER PUBLICATIONS

Partial European Search Report dated Apr. 15, 2020 for European Patent Application No. 17858875.2, 12 pages.

* cited by examiner

| S | C | D | D | D | D | C | D | D | V | V | V | C | D | D | D | C | D | D | D |
|---|---|---|---|---|---|---|---|---|---|---|---|---|---|---|---|---|---|---|---|
| S | R | N | N | N | N | R | D | D | V | V | V | R | D | D | D | R | D | D | D |
| S | R | N | N | N | N | R | D | D | V | V | V | R | D | D | D | R | D | D | D |
| S | C | D | D | D | D | C | D | D | V | V | V | C | D | D | D | C | D | D | D |
| S | R | N | N | N | N | R | D | D | V | V | V | R | D | D | D | R | D | D | D |

*FIG. 1A*

| S | C | D | D | D | D | C | D | D | V | V | V | C | D | D | D | D | C | D | D |
|---|---|---|---|---|---|---|---|---|---|---|---|---|---|---|---|---|---|---|---|
| S | R | N | D | N | D | R | D | D | V | V | V | R | N | D | N | D | R | D | D |
| S | R | N | D | N | D | R | D | D | V | V | V | R | N | D | N | D | R | D | D |
| S | C | D | D | D | D | C | D | D | V | V | V | C | D | D | D | D | C | D | D |
| S | R | N | D | N | D | R | D | D | V | V | V | R | N | D | N | D | R | D | D |

*FIG. 1B*

| S | C | D0 | D1 | D2 | C | D0 | D1 | D2 | V0 | V1 | V2 | C | D0 | D1 | D2 | C | D0 | D1 | D2 |
|---|---|----|----|----|---|----|----|----|----|----|----|---|----|----|----|---|----|----|----|
| S | R | D0 | D1 | D2 | R | D0 | D1 | D2 | V0 | V1 | V2 | R | D0 | D1 | D2 | R | D0 | D1 | D2 |
| S | R | D0 | D1 | D2 | R | D0 | D1 | D2 | V0 | V1 | V2 | R | D0 | D1 | D2 | R | D0 | D1 | D2 |
| S | C | D0 | D1 | D2 | C | D0 | D1 | D2 | V0 | V1 | V2 | C | D0 | D1 | D2 | C | D0 | D1 | D2 |
| S | R | D0 | D1 | D2 | R | D0 | D1 | D2 | V0 | V1 | V2 | R | D0 | D1 | D2 | R | D0 | D1 | D2 |

*FIG. 1C*

METHODS AND SYSTEMS FOR RELIABLE BROADCASTING USING RE-TRANSMISSIONS

CROSS-REFERENCE TO RELATED APPLICATION

This application is a continuation of U.S. patent application Ser. No. 15/288,808 filed Oct. 7, 2016, now U.S. Pat. No. 10,097,318.

FIELD OF THE INVENTION

The present invention relates to the field of multi-hop wireless networks, and in particular, to the field of reliable broadcast communication protocols.

BACKGROUND

Dynamic interference and/or fading environments typically make broadcasting an unreliable operation in a wireless network, particularly with low-power nodes or constrained power consumption requirements. Unreliable communications at the broadcast-level can result in broadcast coverage that is not network-wide. These scenarios may cause reduced throughputs or stagnant/stale nodes, both of which are extremely undesirable for critical network messages and operations.

Modern commercial and military applications require robustness with respect to information dissemination throughout a wireless network, and thus, there is a need for robust broadcast communications in wireless networks. Embodiments of the present invention provide reliable broadcast mechanisms using re-transmissions.

SUMMARY

Thus, it is an object of the present invention to provide methods and systems, including computer program products, for reliable broadcasting using re-transmissions. For example, in one embodiment comprising a wireless network with a source node and a plurality of relay nodes, in which at least one of the plurality of relay nodes is N hops from the source node, a method for reliable broadcasting using re-transmissions over a plurality of timeslots comprises broadcasting the transmission in a first timeslot with a time-to-live (TTL) field set to M and a hop count field set to 1, wherein M is greater than or equal to N, evaluating a trade-off between power consumption and communication reliability, and re-broadcasting the transmission in a second timeslot subsequent to the first timeslot based on the evaluation, wherein the hop count field is incremented prior to the source node re-broadcasting the transmission, wherein each of the plurality of relay nodes is configured to receive the transmission in at least one of the plurality of timeslots, and re-broadcast the transmission in a relay timeslot that is subsequent to the at least one of the plurality of timeslots as long as the hop count field is less than or equal to the TTL field, and wherein the hop count field of the received transmission is incremented prior to each of the plurality of relay nodes re-broadcasting the transmission.

These illustrative embodiments are mentioned not to limit or define the limits of the present subject matter, but to provide examples to aid in the understanding thereof. Illustrative embodiments are discussed in the Detailed Description, and further examples are provided there. Advantages offered by various embodiments may be further understood by examining this specification and/or by practicing one or more embodiments of the claimed subject matter.

BRIEF DESCRIPTION OF THE DRAWINGS

FIGS. 1A, 1B and 1C show illustrative slot assignments for barrage relay networks, according to an embodiment of the present invention;

Figure 2:
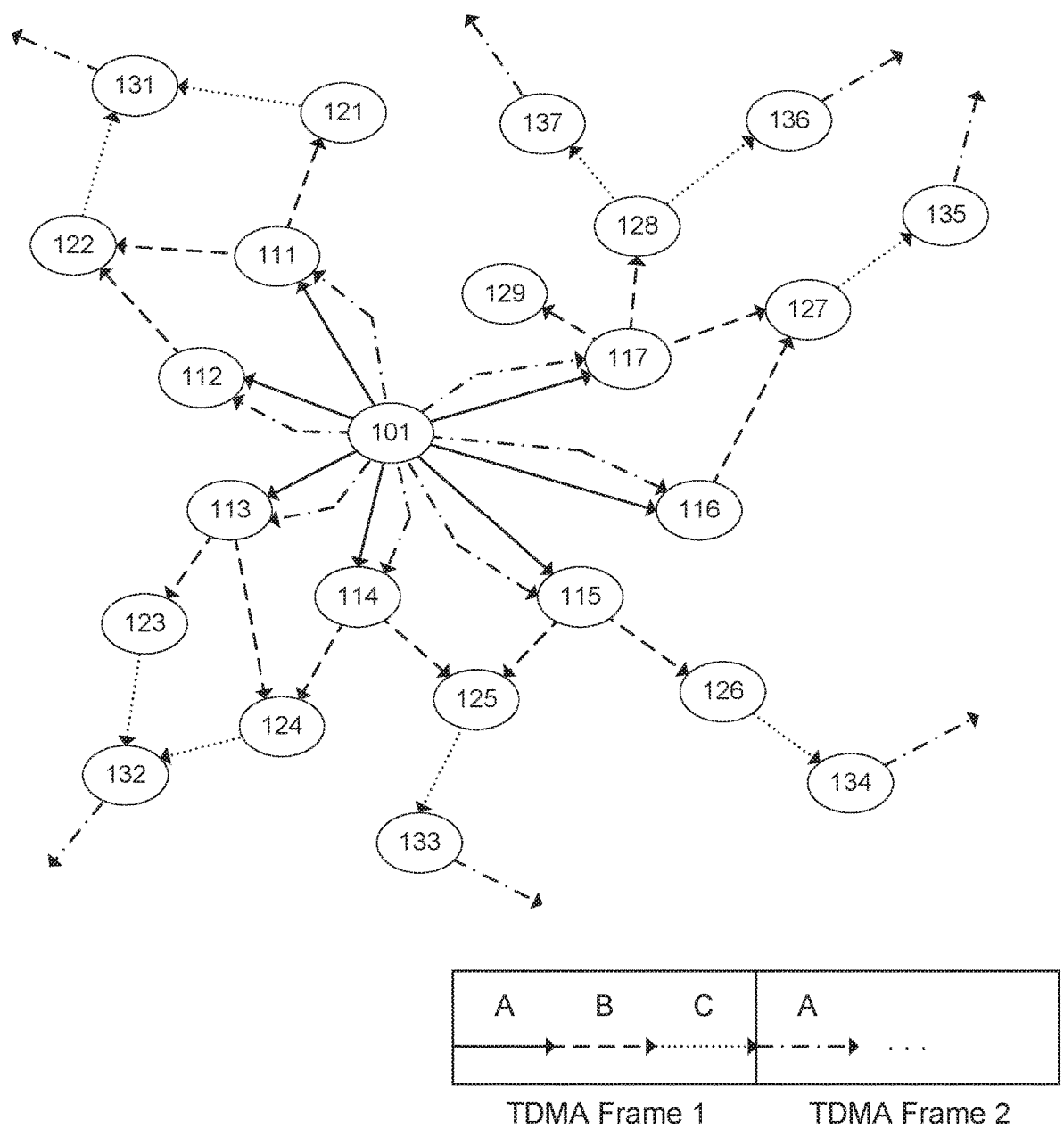
FIG. 2 shows an illustrative broadcast flooding protocol for barrage relay networks, according to an embodiment of the present invention.

Like labels are used to refer to the same or similar modules and/or events on a timeline in the drawings.

DETAILED DESCRIPTION

In the Summary above and in this Detailed Description, in the claims below, and in the accompanying drawings, reference is made to particular features (including method steps and timelines) of the invention. It is to be understood that the disclosure of the invention in this specification does not include all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

When reference is made herein to a timeline comprising two or more defined events, the defined events can be carried out in any order or simultaneously (except where the context excludes that possibility), and the timeline can include one or more other events which are carried out before any of the defined events, between the defined events, or after all the defined events (except where the context excludes that possibility).

The present invention is directed towards a multi-hop, time-slotted wireless network. That is, a wireless network that may implement a time-division multiple access (TDMA) scheme that divides a unit of time (for example, one second, which may be referred to as a frame) into slots, each of which are dedicated for the transmissions and reception of messages from nodes that may be multiple hops from each other. Without loss of generality, timeslots for transmission may be consecutive or assigned at specific times within the frame, wherein the latter approach is typically referred to as a "virtual channel" or a "logical channel."

In an example, the representative slot assignments shown in FIGS. 1A, 1B and 1C define virtual channels for different types of messages including synchronization, data and voice messages. Table 1 provides a legend for some of the types of slots assigned within a frame.

TABLE 1

| Logical channels used in slot assignments | |
|---|---|
| S | Synchronization logical channel |
| C | Clear-to-send logical channel |
| R | Request-to-send logical channel |
| N | Network maintenance logical channel |
| D | Data logical channel |
| V | Voice logical channel |

Embodiments of the present invention, as described in the Detailed Description and shown in the Drawings, describe operations in the context of "subsequent timeslots." It is to be noted that subsequent timeslots may represent either the very next timeslot in time, or as in the context of FIGS. 1A, 1B and 1C, the very next timeslot that has been assigned to that particular type of message. That is, a subsequent timeslot may be the very next timeslot in the virtual (or logical) channel, and not necessarily subsequent in time and/or frequency.

A Barrage Relay Network (BRN), which is an example of a wireless network that supports embodiments of the present invention, is shown in FIG. 2. The BRN in FIG. 2 illustrates a wireless network where independent medium allocations are obtained via a time-division multiple access (TDMA) scheme. While BRNs can be defined according to various medium allocation schemes (e.g., time-slotting, different frequency channels, different antenna radiation patterns, low cross-correlation spreading sequences), embodiments of the present invention are described in the context of a time-slotted barrage relay network.

In particular, time is divided into frames, which are further divided into multiple slots per frame (for example, FIG. 2 employs 3 slots per frame labeled "A," "B" and "C"). The data that is transmitted in a given time slot is denoted a "packet." Two packets that are transmitted by two different nodes are said to be identical if all data—including all protocol header information—contained in the respective packets is identical.

In an embodiment, for example, a central node 101 transmits a packet on slot A of the first TDMA frame. All nodes that successfully receive this packet are, by definition, one hop away from the source; these nodes are labeled 111, 112 . . . 117 in FIG. 2. These nodes transmit the same packet on slot B, thus relaying to nodes that are two hops away from the source (nodes 121, 122 . . . 129), which in turn transmit the same packet on slot C. Nodes that are three hops away from the source node (nodes 131, 132 . . . 137) relay the packet on slot A of the second TDMA frame. Thus, packets transmit outward from the source via a decode-and-forward approach.

In the embodiment shown in FIG. 2, a number of two-hop nodes receive the same packet from different one-hop nodes. These packets do not collide due to the physical (PHY) layer processing employed by BRNs. In particular, BRNs employ a PHY layer that allows identical packets to be combined at the receiver in a manner analogous to multipath mitigation in traditional radio receivers. That is, the multiple, time-shifted copies of the received signal that arise in BRNs can be interpreted at the receiver as resulting not from different transmitting nodes, but from reflections off, for example, buildings when a single source transmits.

In order for two packets to be identical, both the payload data and all protocol header data must be identical. Therefore, protocol headers in a barrage relay network can be modified only in a manner that is common across all nodes at a given hop distance from the source. This is in stark contrast to traditional layered network architectures that employ a point-to-point link abstraction at Layer 2, wherein protocol headers can be modified in a node-specific—as opposed to a hop-specific—manner.

In some embodiments, the spatial reuse of time slots enables packets to be pipelined into the source for transmission every three slots. Specifically, as shown in FIG. 2, the one-hop nodes will not receive the packet broadcast by the three-hop nodes during slot A of the second TDMA frame. Thus, the source can safely transmit a second packet during that slot. In this manner, a throughput of W/3 can be achieved for broadcast in a single-source BRN (wherein W is the capacity of a single point-to-point link). This efficient injection of messages for broadcast transmission is denoted "spatial pipelining" in order to highlight its reuse of time slots between spatially separated nodes.

More generally, spatial pipelining can be achieved by having a source node inject a new packet for every barrage relay broadcast every M slots resulting in a throughput of W/M. In this context, M is referred to as the spatial pipelining factor. In some embodiments, when the size of an arbitrary wireless network is not known to the source a priori, M must be at least 3 to avoid collisions. Larger spatial pipelining factors (e.g. 4) may be chosen in order to enhance robustness in highly mobile network topologies.

Furthermore, in order to contain the extent of a given barrage relay transmission, two fields can be incorporated into the header (preamble) of each data packet: a time-to-live (TTL) field and a hop count (HC) field. The TTL field is unchanged by relaying nodes while the HC field is initially set to 1 by the source of the packet and incremented upon relay. In the context of FIG. 2, the central node 101 may set the TTL field to 8, and enable the packet to propagate over 8 hops through the BRN. The one-hop neighbors of this central node would receive such packets and relay a modified packet with the HC field set to 2. Similarly, two-hop neighbors set the HC to 3, and so on. Relaying continues whenever a received packet has an HC field that is less than or equal to the TTL field, but stops if this condition cannot be satisfied.

Although the description of the interaction between the TTL and HC fields is in the context of BRNs, the notion of increasing the HC field upon relaying and stopping the relaying process when a packet with equal TTL and HC fields is received is not limited to BRNs, and is compatible with wireless networks, in general.

Figure 3A:
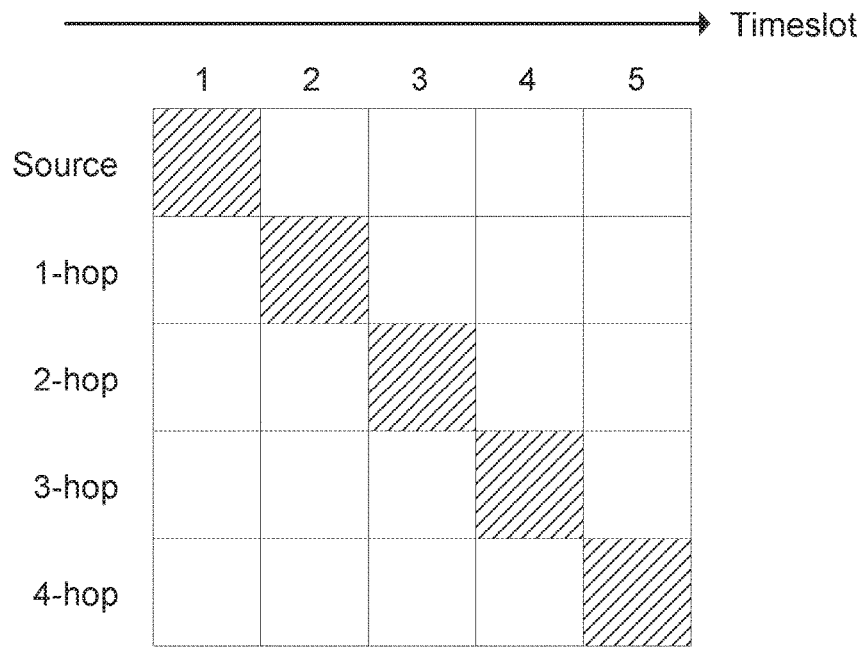
FIGS. 3A and 3B show assignments of timeslots in a multi-hop network for the basic broadcast mechanism.
Figure 3B:
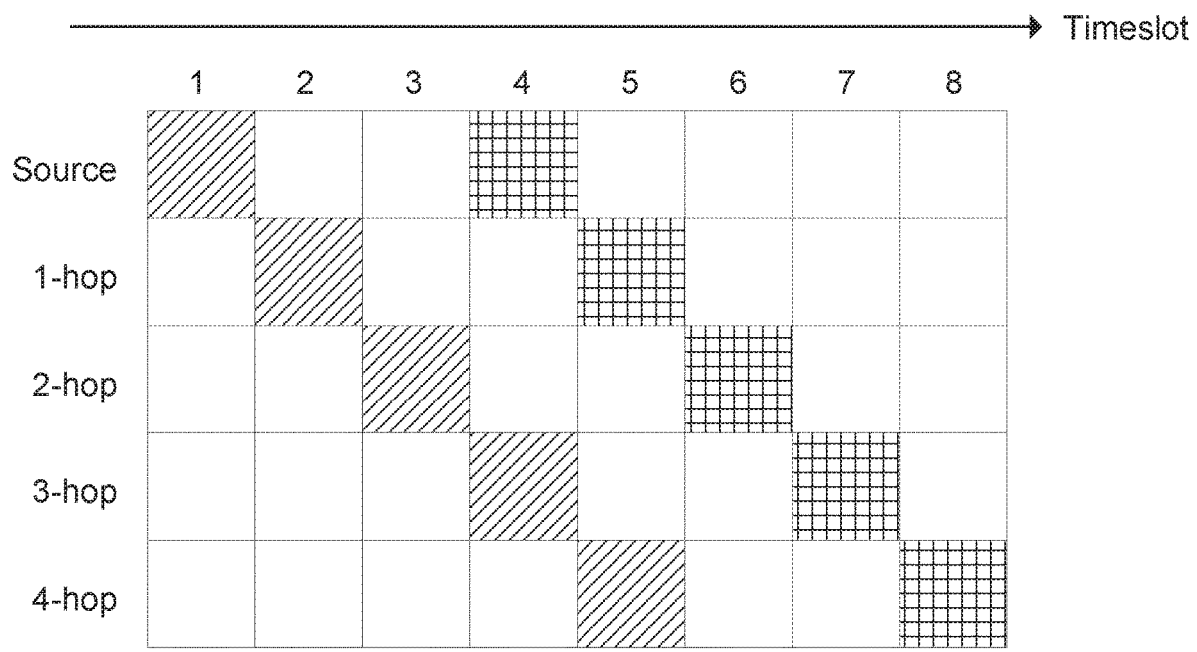

FIGS. 3A and 3B show an assignment of timeslots for a basic broadcast mechanism in a multi-hop wireless network, wherein a shaded square represents a transmission by the node specified on the y-axis in the timeslot specified by the x-axis, and a blank/white square represents a node receiving the transmission, or more generally, in a listening state. As shown in FIG. 3A, a source node broadcasts a transmission in a first timeslot, which is received by one or more nodes that are one-hop away from the source node in that same timeslot. Each of the one-hop neighbors of the source node relay (or re-broadcast) the transmission in a second timeslot subsequent to the first timeslot. As noted above, the subsequent timeslot may be in time, or in the context of a logical or virtual channel, based on slot assignments, as shown in FIGS. 1A, 1B and 1C.

The broadcast mechanism continues in consecutive timeslots, as shown in FIG. 3A, as each of a set of nodes that are an increasing number of hops away from the source node receive the transmission, and re-broadcast it in a subsequent timeslot to ensure its dissemination network-wide. For the basic broadcast mechanism, the TTL field may be set equal to the number of hops since nodes are expected to relay the transmission in a timeslot subsequent to that in which the transmission is received.

FIG. 3B shows the timeslot assignments for the basic broadcast mechanism in a barrage relay network, which employs a spatial pipelining factor of 3. As shown in FIG. 3B, a first transmission (shown with linear hatching) starts from the source node in timeslot 1, and is relayed through the network as shown in FIG. 3A. However, a second transmission (shown with cross-hatching) is started 3 slots timeslots later, in timeslot 4, and can propagate network-wide without colliding with the first transmission, as discussed in the context of FIG. 2.

The basic broadcast mechanism, however, is susceptible to failure at each of the hops in that if nodes at a certain hop-distance away from the source node are not able to successfully receive the transmission, it cannot be relayed to nodes that lie further away from the source. This failure scenario is catastrophic if the link between the source node and its one-hop neighbors is fragile, since now the transmission can never be disseminated through the network.

In order to ensure that mission critical and/or high-priority transmissions may be broadcast throughout the wireless network, embodiments of the present invention incrementally employ re-transmissions to ensure reliable broadcasts. That is, power consumption (which increases as the number of re-transmissions increase) is traded-off, in an incremental manner, for communication reliability (which can be interpreted as a decreasing packet error rate or an increasing message completion rate). In scenarios and environments wherein re-transmissions are expected, the TTL field may be set to a value M that is greater than the number of hops N, which ensures that a subsequent (i.e. not necessarily the first) transmission from the source or a relay node will be successfully received by nodes that are a greater number of hops away.

Increasing the number of re-transmissions in a broadcast network is atypical for wireless networks, since wireless network protocols are designed to minimize collisions when using broadcast transmissions. However, embodiments of the present invention propose using re-transmissions to leverage the time- and spatial-diversity that inherently exists between pairs of nodes in a wireless network. That is, if multiple nodes at a certain hop distance re-broadcast their transmissions on subsequent slots, nodes that are one further hop away are more likely to successfully decode the transmission.

In the case of BRNs, collisions are never an issue due to the PHY layer combining implemented at each node. Re-broadcasting the transmission, as discussed in various embodiments of the present invention, will ensure that communication reliability is increased for broadcasts in a BRN, albeit at the expense of increased power consumption.

Table 2 overviews the different broadcast mechanisms with re-transmissions (BMR) that are proposed in the present invention.

TABLE 2

Different broadcast mechanisms with re-transmission (BMR) protocols

| | | |
|---|---|---|
| dsBMR | Double-source-transmit | Source node re-broadcasts in an additional subsequent timeslot |
| sBMR | Source-recursive | Source node re-broadcasts in all available additional timeslots |
| dBMR | Double-transmit | Source node and relay nodes re-broadcast in an additional subsequent timeslot |
| rBMR | Recursive | Source node and relay nodes re-broadcast in all available additional timeslots |
| pBMR | Priority-data | Source nodes and relay nodes re-broadcast in an additional timeslot two timeslots after original broadcast timeslot |

Figure 4A:
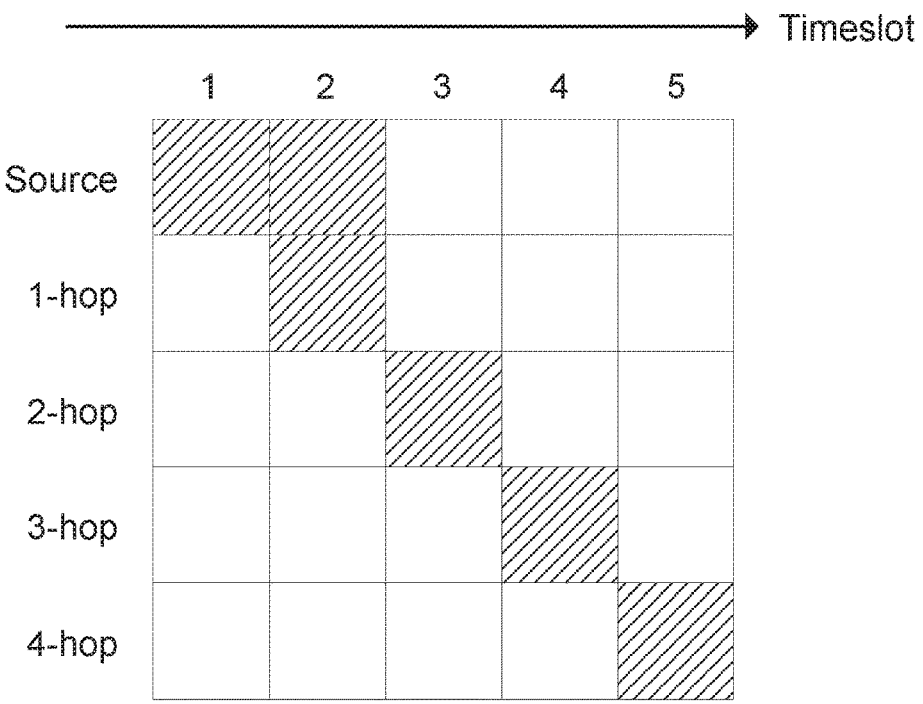
FIGS. 4A and 4B show assignments of timeslots in a multi-hop network for the double-source-transmit broadcast mechanism with re-transmissions (dsBMR) protocol, according to an embodiment of the present invention.
Figure 4B:
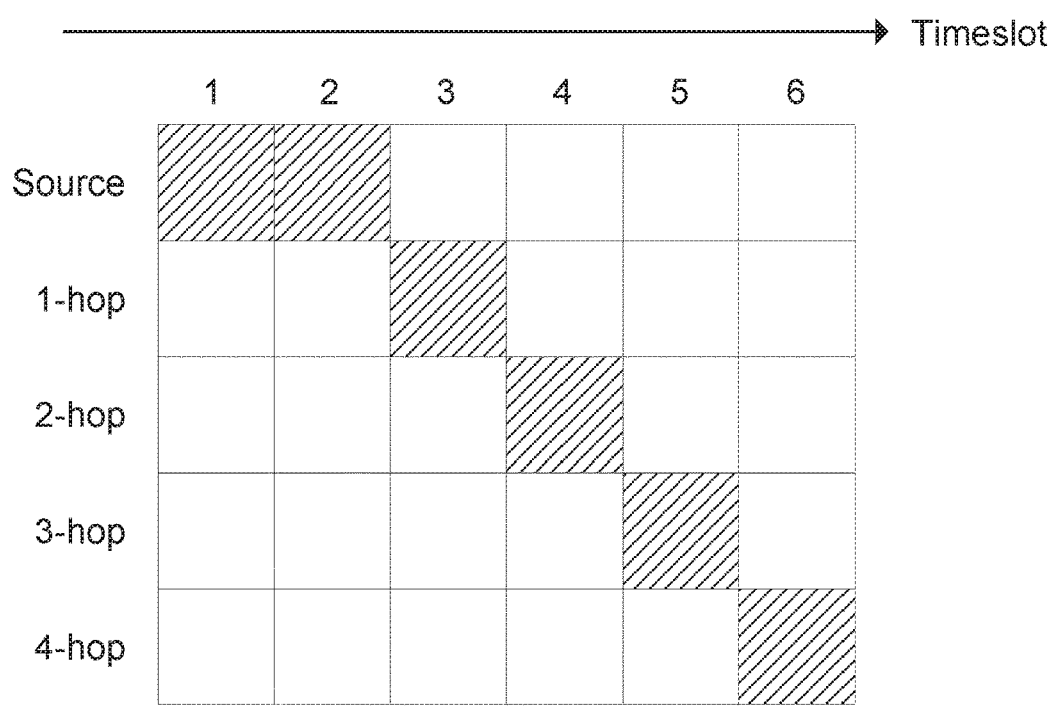

FIG. 4A and FIG. 4B show an assignment of timeslots for the double-source-transmit broadcast mechanism with re-transmissions (dsBMR) protocol, according to an embodiment of the present invention. As seen in both FIGS. 4A and 4B, the source node broadcasts the transmission in a first timeslot. Based on evaluating the trade-off between power consumption and communication reliability, the source node re-broadcasts the transmission in a second timeslot subsequent to the first timeslot. FIG. 4A depicts the nodes that are one-hop away receiving the transmission in the first timeslot, and broadcasting it on the subsequent second timeslot in order to disseminate the transmission network-wide. In contrast, FIG. 4B depicts the one-hop neighbors being unable to successfully decode the transmission on the first timeslot, but being able to do so on the second timeslot, and broadcasting it on the subsequent third timeslot.

Since the source is configured to re-broadcast the transmission based on the evaluation, the TTL field is set higher than the number of hops over which the broadcast must disseminate to ensure its network-wide propagation. In the embodiments described in FIGS. 4A and 4B, setting the TTL field, for example, to a value of 6 (in a 4-hop wireless network) will ensure the transmission is broadcast network-wide.

Evaluating the trade-off between power consumption and communication reliability enables to the source node to re-broadcast the transmission in a second timeslot, which ensures the network-wide dissemination of the transmission in the case of FIG. 4B. In an embodiment, the evaluation may be based on one or more of the following factors: the number of one-hop neighbors of a node in the wireless network, a set of link qualities between the node and its one-hop neighbors, previously collected statistics for packet error rate (PER), bit error rate (BER) and message completion rate (MCR), a type and/or priority of the transmission, and a state of the node. In an example, the state of the node may be represented by detectability constraints (e.g., how often a node should broadcast a transmission lest it be discovered due to frequent transmissions) and/or the battery level of the node.

Figure 5A:
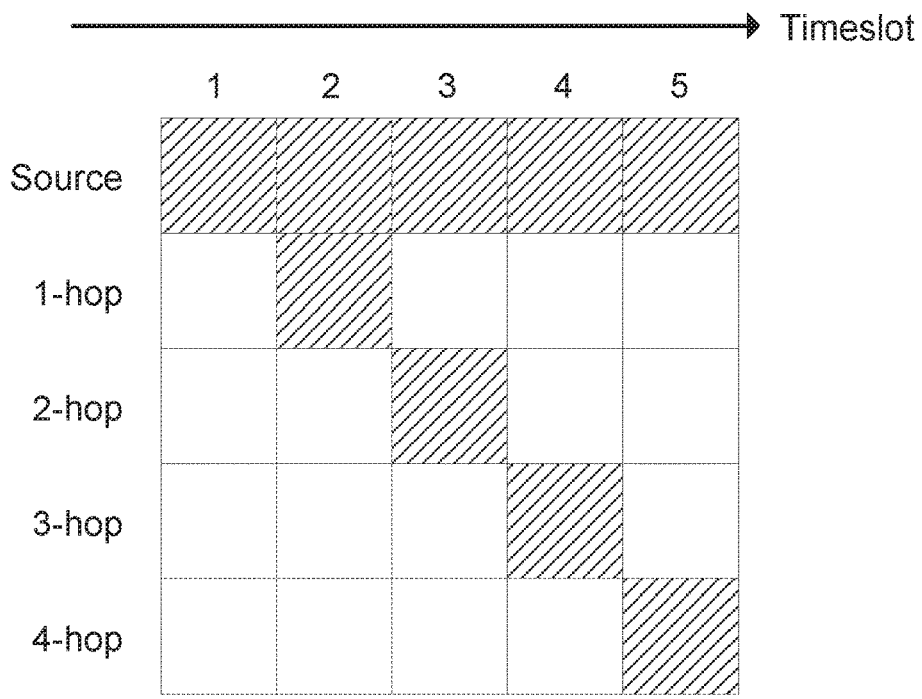
FIGS. 5A and 5B show assignments of timeslots in a multi-hop network for the source-recursive broadcast mechanism with re-transmissions (sBMR) protocol, according to an embodiment of the present invention.
Figure 5B:
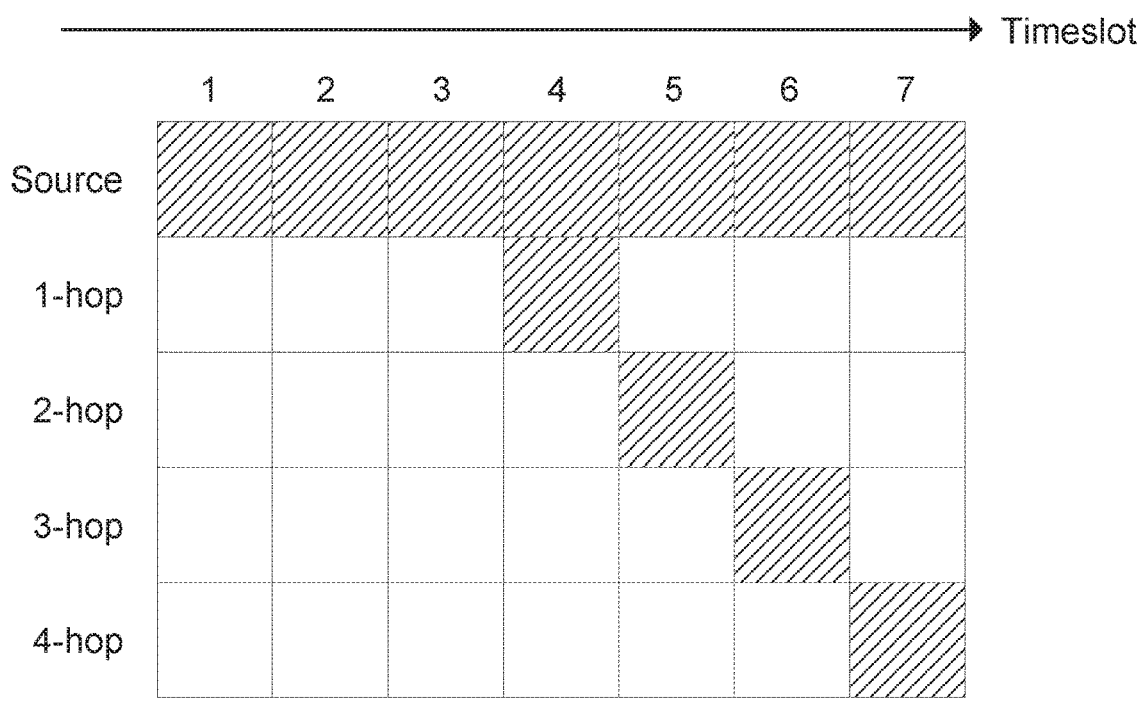

In another embodiment, the link between the source node and the other nodes in the wireless network may be the most fragile. That is, the source node may be a network-edge node that needs to communicate information to the remainder of the network, but is unable to move closer to the other nodes. FIG. 5A and FIG. 5B show an assignment of timeslots for source-recursive broadcast mechanism with re-transmissions (sBMR) protocol, according to embodiments of the present invention, that are well-suited to the use case described above.

As shown in FIGS. 5A and 5B the source node broadcasts the transmission in a first timeslot. An evaluation of the trade-off between power consumption and communication reliability may direct the decision to include additional re-transmissions, in comparison to the dsBMR protocol. That is, the source node re-broadcasts the transmission on each available timeslot subsequent to the first timeslot based on the evaluation (timeslots 2-5 in FIG. 5A.

The one-hop neighbors of the source node receive the transmission in the first timeslot in FIG. 5A, and broadcast the transmission in timeslot 2. However, as seen in FIG. 5B, one-hop neighbors of the source node are unable to successfully receive the transmission until timeslot 3, and then re-broadcast the transmission on the subsequent timeslot to ensure network-wide dissemination of the transmission.

The sBMR protocol enables the source node to continually re-broadcast a critical transmission on each available timeslot thereby overcoming the fragility of the first hop. The fragility of the first hop may be due to an increased distance between the source node and the remainder of the network. Alternatively, a higher interference environment may exist around the source node. For example, the source node at the network edge may be in the vicinity of another network whose communications are adversely impacting communications between the source node and the other nodes in its network.

Figure 6:
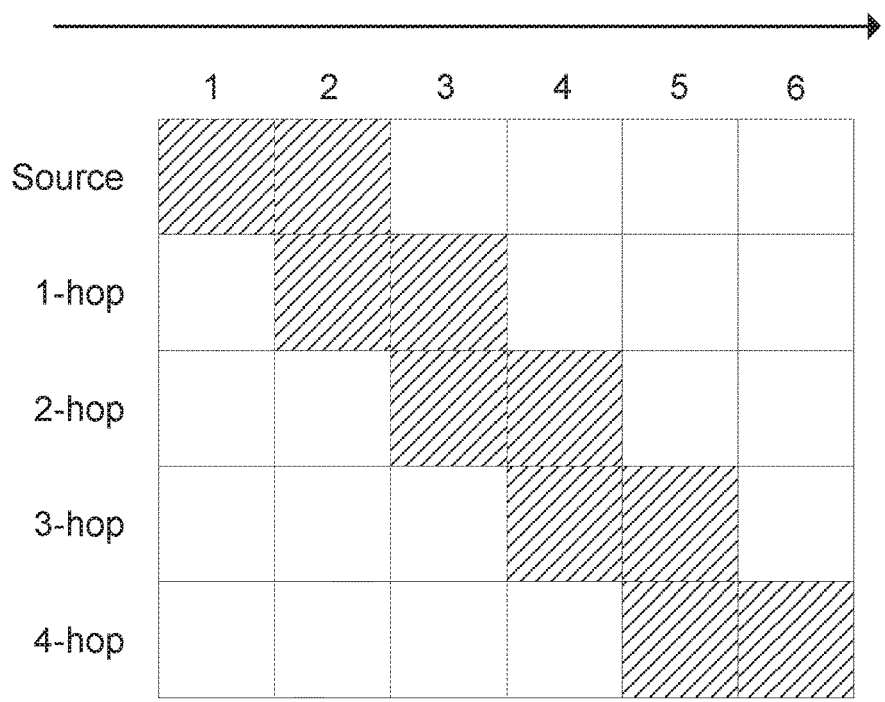
FIG. 6 shows an assignment of timeslots in a multi-hop network for the double-transmit broadcast mechanism with re-transmissions (dBMR) protocol, according to an embodiment of the present invention.

FIG. 6 shows an assignment of timeslots for double-transmit broadcast mechanism with re-transmissions (dBMR) protocol, according to embodiments of the present invention. The dBMR protocol trades power consumption for an increased reliability for all the hops in the wireless network. That is, the source node transmits on a first timeslot and a second timeslot that is subsequent to the first timeslot.

Similarly, each of the relay nodes is configured to broadcast a received transmission on a subsequent timeslot and the one following it based on the evaluation. As discussed above in the context of the dsBMR and sBMR protocols, the relay nodes need not necessarily receive the broadcast transmission from the source node (or previous hop) on the first transmission timeslot. In fact, the possibility of receiving the transmission on the second timeslot is what enables the increased robustness of embodiments of the present invention, as compared to the basic broadcast mechanism.

As discussed above, nodes employing the dBMR protocol re-broadcast the transmission, based on the evaluation, to enable nodes that are a greater number of hops away to successfully receive the transmission over two timeslots. For example, in a 4-hop wireless network, the TTL field may be set to 10 to maximize the probability of network-wide dissemination of the transmission.

Figure 7:
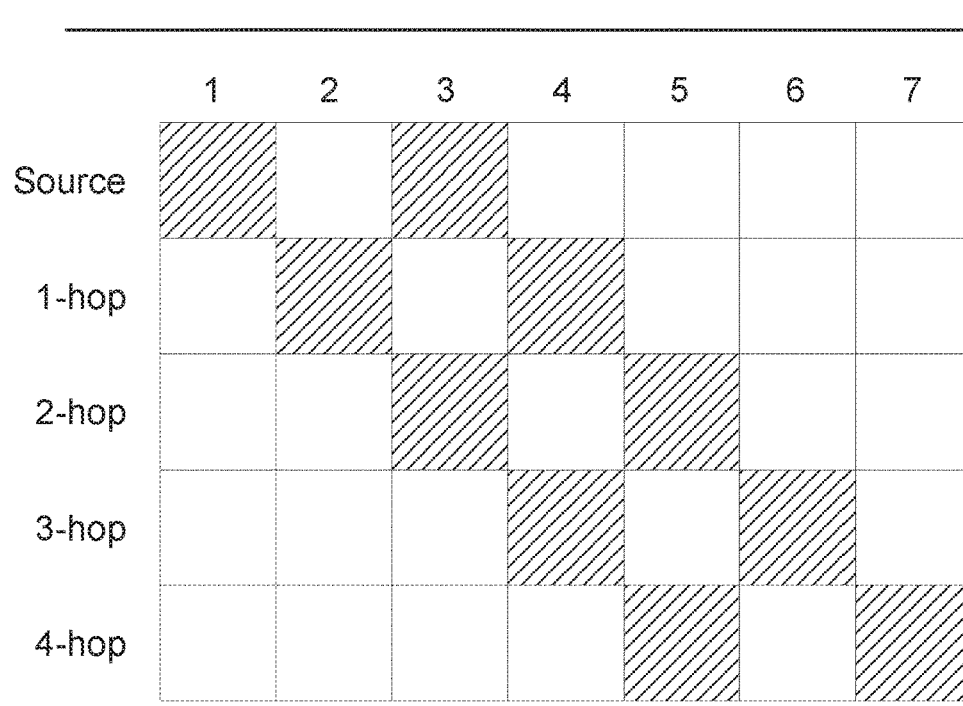
FIG. 7 shows an assignment of timeslots in a multi-hop network for the priority data broadcast mechanism with re-transmissions (pBMR) protocol, according to an embodiment of the present invention.

FIG. 7 shows an assignment of timeslots for the priority-data broadcast mechanism with re-transmissions (pBMR) protocol, according to embodiments of the present invention. The pBMR protocol supports the reliable broadcast of high-priority data in a wireless network. That is, it ensures that high-priority data is received by each node in the wireless network, even in the presence of other nodes broadcasting standard-priority transmissions.

The pBMR protocol requires every node in the wireless network to broadcast a transmission in a timeslot subsequent to the timeslot in which it was received, as well as in a timeslot that is two timeslots later. As shown in FIG. 7, the transmission is broadcasted by the source node in timeslot 1, and then re-broadcasted it in timeslot 3, with the relay nodes operating in a similar manner. The efficacy of the pBMR protocol in ensuring the reliable broadcast of high-priority data throughout a wireless network will be further evidenced in the context of FIGS. 9-11.

Figure 8A:
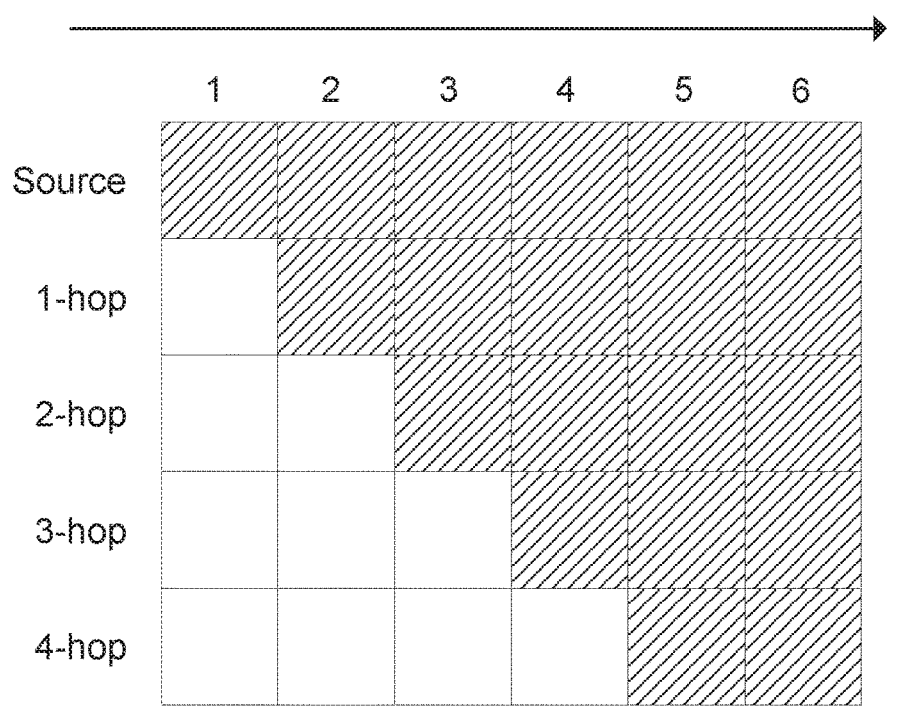
FIGS. 8A and 8B show assignments of timeslots in a multi-hop network for the recursive broadcast mechanism with re-transmissions (rBMR) protocol, according to an embodiment of the present invention.
Figure 8B:
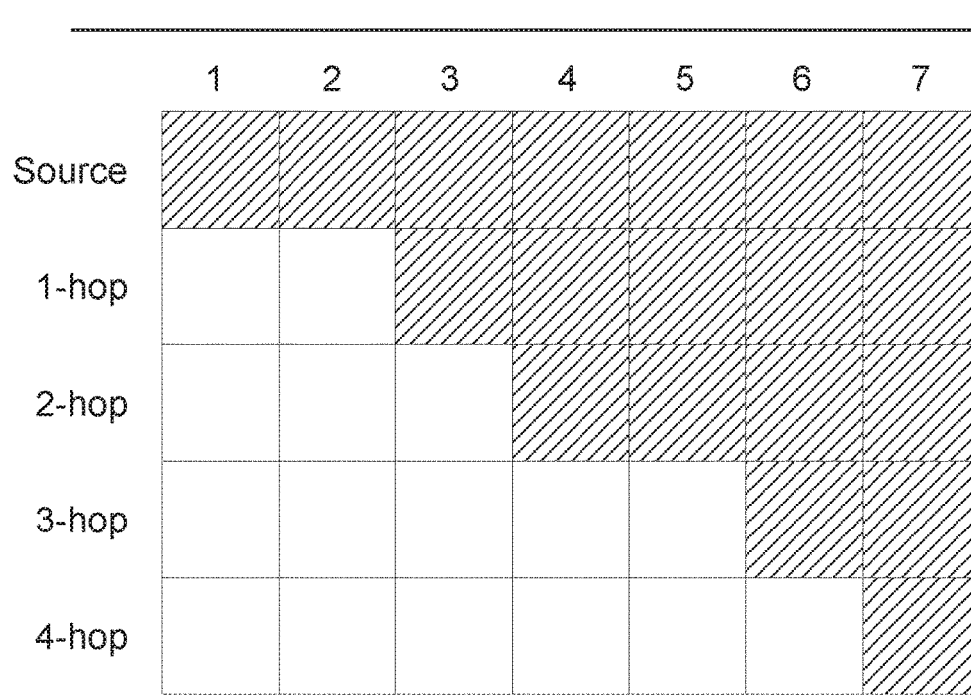

In communication environments with high levels of interference, embodiments of the present invention are able to provide a more drastic trade-off between power consumption and communication reliability. FIGS. 8A and 8B show an assignment of timeslots for the recursive broadcast mechanism with re-transmissions (rBMR) protocol, according to embodiments of the present invention. In both FIGS. 8A and 8B, the source node broadcasts the transmission in a first timeslot, and continues to re-broadcast the transmission in each subsequent timeslot in an attempt to overcome the high levels of interference. Similarly, relay nodes re-broadcast the transmission in each available timeslot subsequent to the timeslot in which the transmission is received.

In FIG. 8A, each of the relay nodes receive the transmission on the first transmission attempt by the source node (or the nodes at the hop before it), and continue to re-broadcast the transmission is every subsequent timeslot. FIG. 8B depicts a similar scenario, but the relay nodes do not necessarily receive the transmission on the first broadcast attempt. Re-broadcasting the transmission in each available timeslot increases the probability of network-wide dissemination of the transmission, but at the expense of power consumption since every node continues to re-broadcast the transmission on every available subsequent slot.

As described earlier, FIGS. 9-11 show timelines that demonstrate the efficacy of the pBMR protocol in reliably disseminating a transmission network-wide. The timelines shown in FIGS. 9-11 are representative of the functionality of embodiments of the present invention, but are not meant to be limiting with regard to, for example, the number of nodes shown and the initialization of transmissions (except where the context excludes that possibility).

Figure 9:
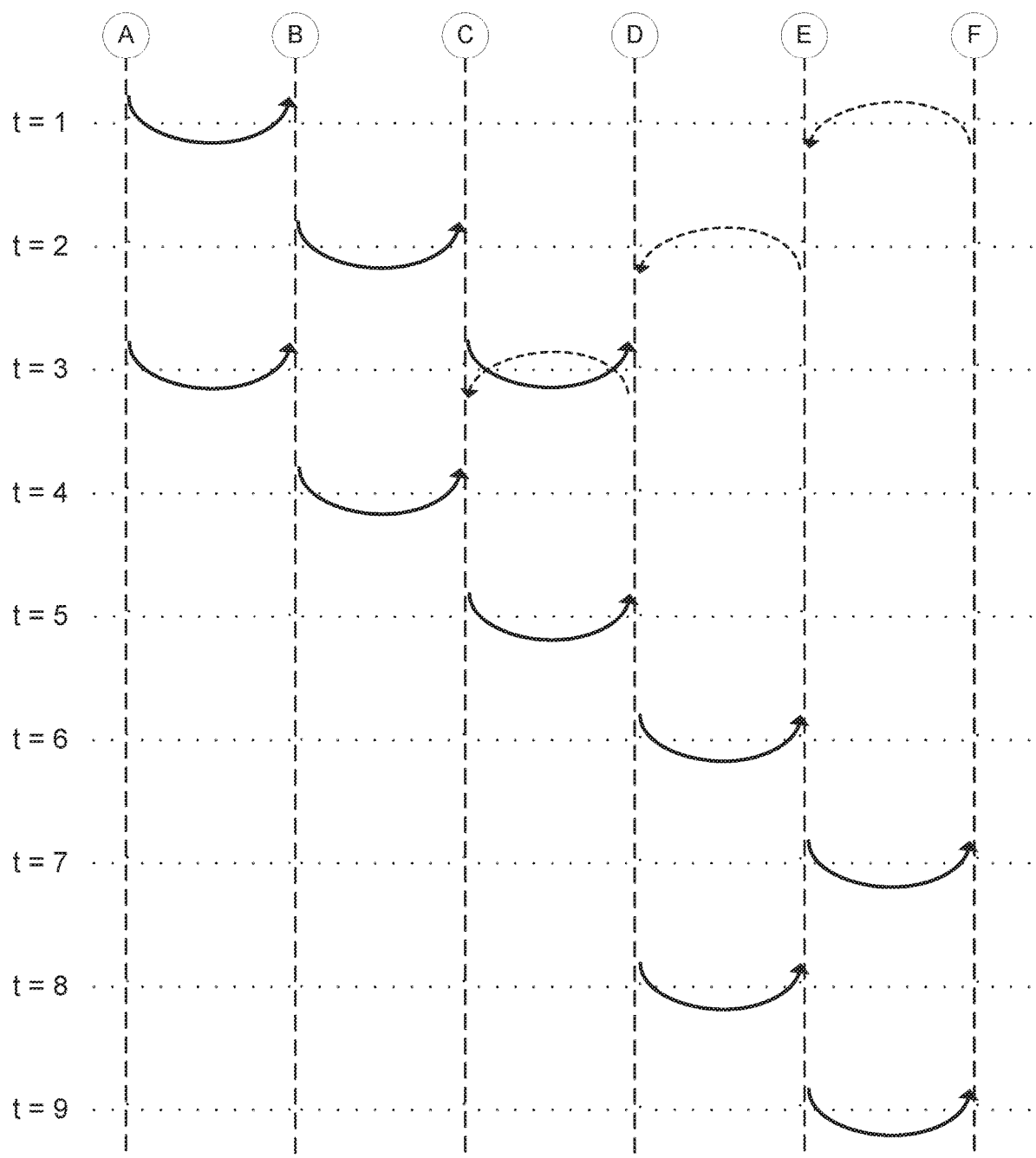
FIG. 9 shows a first timeline of events describing the priority data broadcast mechanism with re-transmissions protocol, according to an embodiment of the present invention.

FIG. 9 shows a timeline of events describing the priority data broadcast mechanism with re-transmissions (pBMR) protocol, wherein node A initiates a high-priority transmission (show using a solid line) at time t=1. Simultaneously, node F initiates a standard-priority broadcast transmission (shown using a dashed line). The high-priority transmission propagates through nodes B and C, while the standard-priority transmission is relayed by nodes E and D. At time t=3, Node C broadcasts the high-priority transmission and Node D broadcasts the standard-priority transmission. A simultaneous broadcast of the high- and standard-priority transmissions prevents either of nodes C and D from being able to successfully decode either transmission.

However, at time t=3, which is two timeslots after time t=1, the first source node (Node A) re-broadcasts the high-priority transmission in accordance with embodiments of the present invention. The pBMR protocol requires the re-broadcast of the high-priority transmission, which is now able to propagate (via relaying through nodes B through E) network-wide, eventually reaching Node F in time t=9. Thus, the pBMR protocol is robust to collisions of the high-priority broadcasts with standard-priority broadcasts. Note that the pBMR protocol does not guarantee the dissemination of the standard-priority transmission, but ensures that the high-priority transmission is broadcast network-wide.

Figure 10:
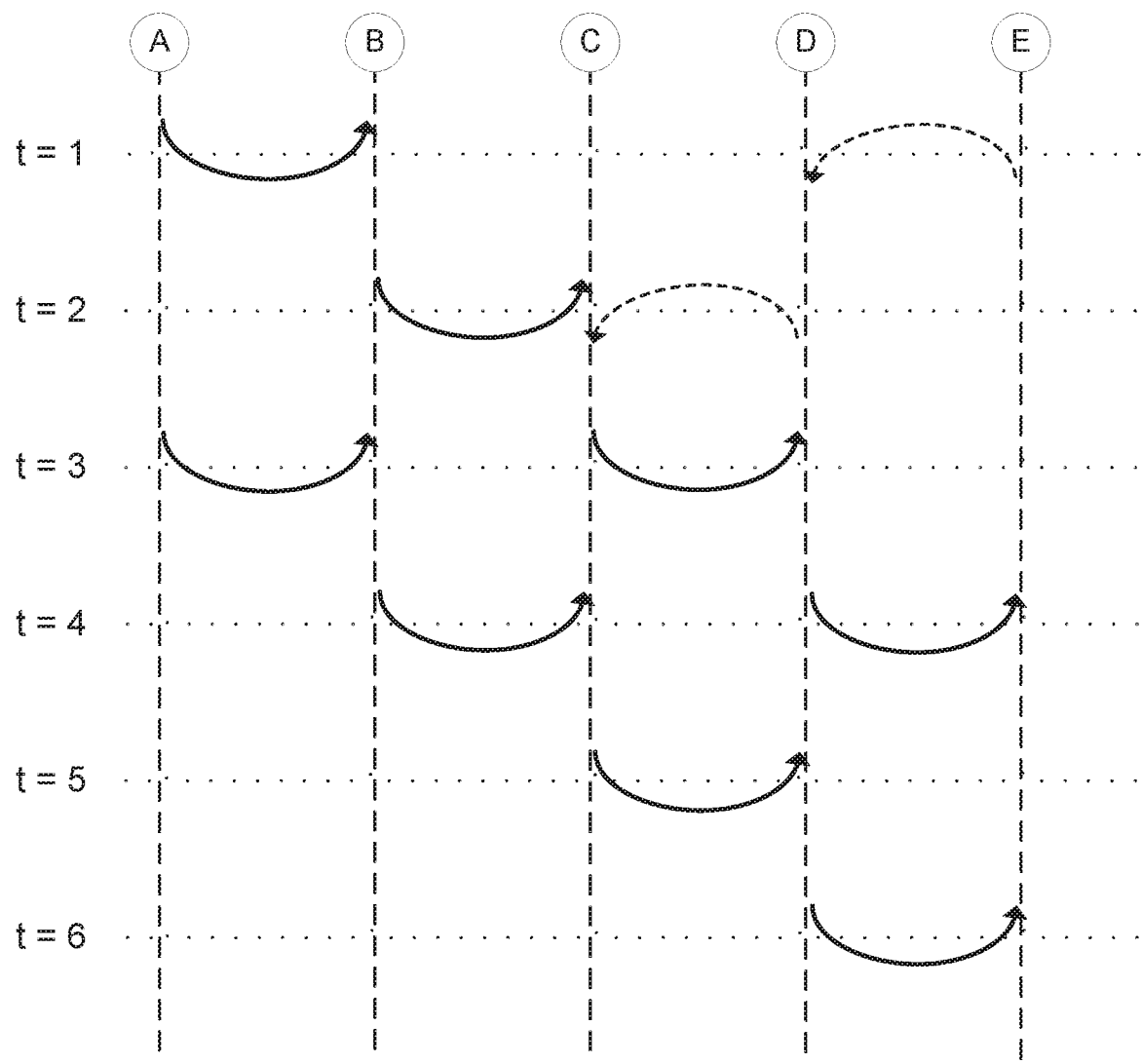
FIG. 10 shows a second timeline of events describing the priority data broadcast mechanism with re-transmissions protocol, according to an embodiment of the present invention.
Figure 11:
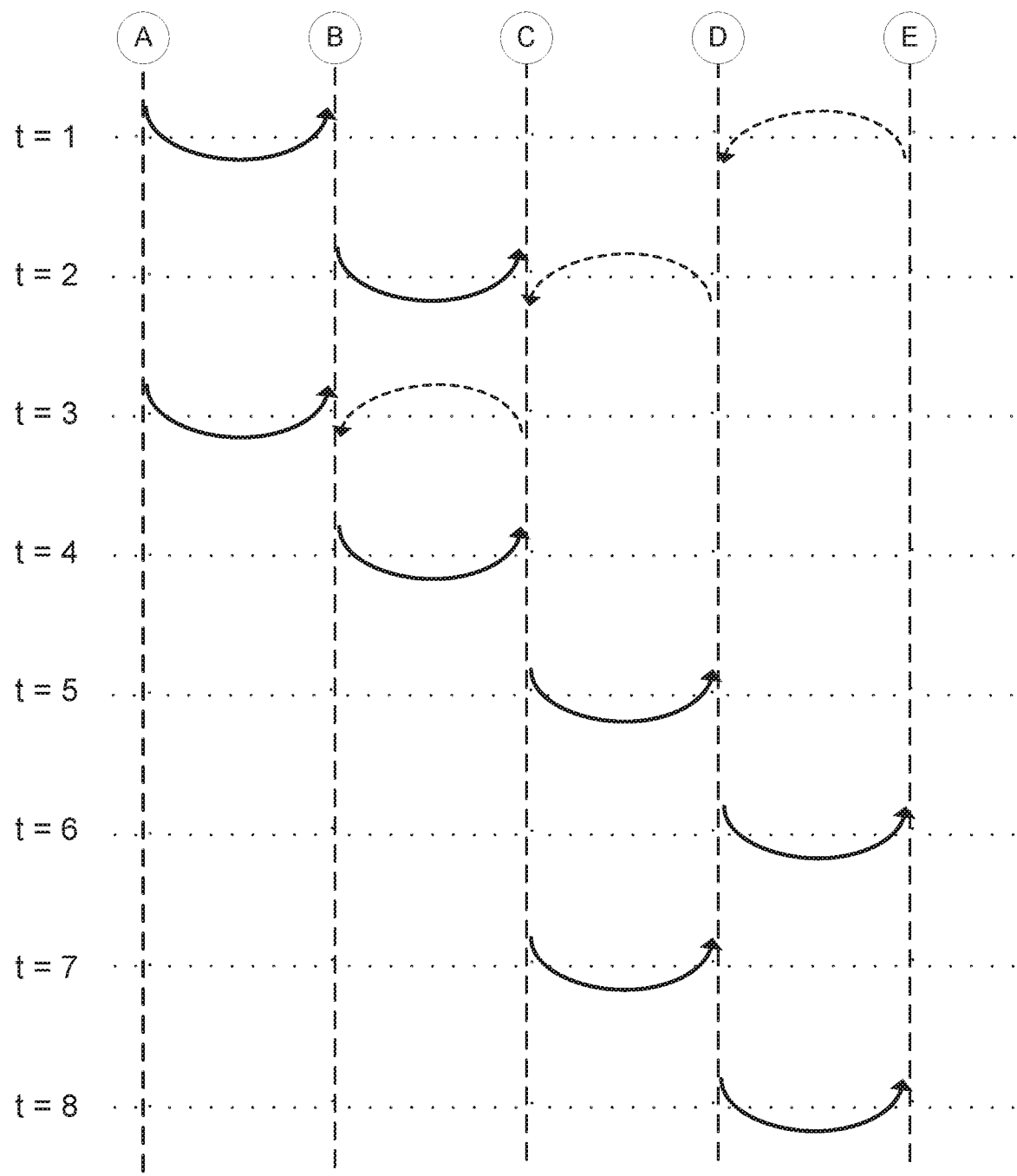
FIG. 11 shows a third timeline of events describing the priority data broadcast mechanism with re-transmissions protocol, according to yet another embodiment of the present invention.

FIG. 10 shows another timeline of events describing the priority data broadcast mechanism with re-transmissions (pBMR) protocol, according to an embodiment of the present invention. This embodiment includes some timeline events and/or steps that are similar to those shown in FIG. 9 and described above. At least some of these timeline events and/or steps may not be separately described in this section.

As shown in FIG. 10, at time t=2, node C receives the high-priority transmission from node B as well as the standard-priority transmission from node D. In this example, node C is able to successfully decode the high-priority transmission at time t=2, and broadcasts the high-priority transmission in times t=3 and t=5, in accordance with the embodiments of the present invention. In this example, the standard-priority transmission is not successfully decoded by node C, and does not affect the network-wide dissemination of the high-priority transmission.

FIG. 11 shows yet another timeline of events describing the priority data broadcast mechanism with re-transmissions (pBMR) protocol, according to an embodiment of the present invention. This embodiment includes some timeline events and/or steps that are similar to those shown in FIGS. 9 and 10, and described above. At least some of these timeline events and/or steps may not be separately described in this section.

As shown in FIG. 11, and similar to FIG. 10, at time t=2, node C receives the high-priority transmission from node B as well as the standard-priority transmission from node D. However, in contrast to the example in FIG. 10, node C is able to successfully decode the standard-priority transmission at time t=2. At time t=3, node C broadcasts the standard-priority transmission. At time t=4, node C receives the high-priority transmission from the re-broadcast of the high-priority transmission at time t=1 from node A, and the relaying of this second re-broadcast at time t=4 by node B. Node C re-broadcasts the high-priority transmission at t=5, and it is disseminated to node E by time t=8. Further note that node B at time t=3 is in the same position as node C at time t=2. That is, it simultaneously receives the high-priority transmission from node A, as well as the standard-priority transmission from node C. In this example, it is assumed that node B was successfully able to decode the high-priority transmission.

FIGS. 12-15 depict flowcharts for embodiments of the present invention that enable reliable broadcasts using re-transmissions. The methods described herein are presented in the context of a wireless network comprising at least a source node and a plurality of relay nodes, wherein at least one of the relay nodes is N hops away from the source node.

Figure 12:
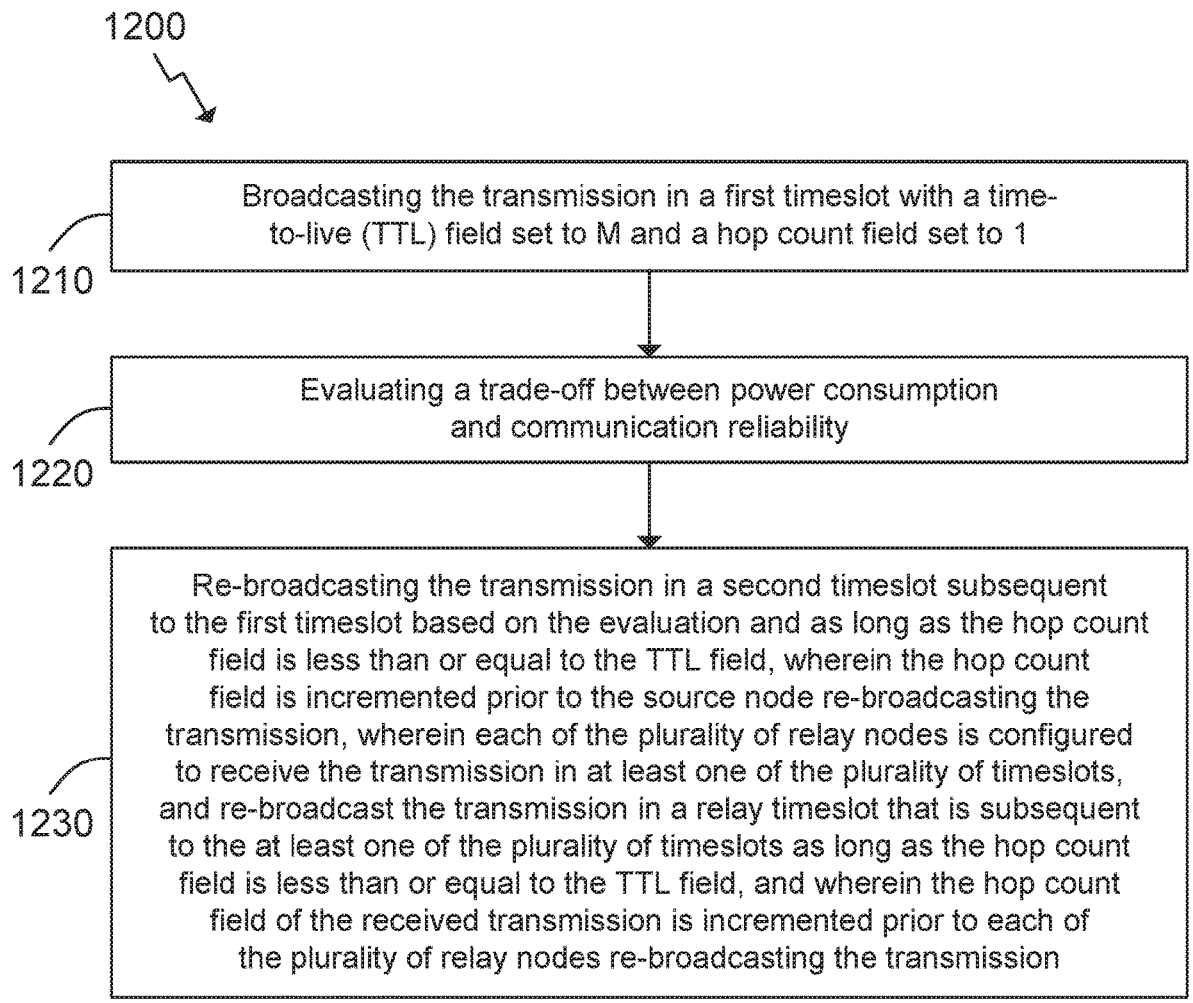
FIG. 12 is a flowchart for a method for the dsBMR protocol, according to an embodiment of the present invention.

FIG. 12 is a flowchart for a method based on the double-source-transmit broadcast mechanism with re-transmissions (dsBMR), according to an embodiment of the present invention. In some embodiments, the order of the steps may be changed. Furthermore, some of the steps in the flowchart may be skipped or additional steps added. The method 1200 begins at 1210, wherein the source node broadcasts a transmission in a first timeslot with a time-to-live (TLL) field set to N and a hop count field set to 1.

At step 1220, the source node evaluates a trade-off between power consumption and communication reliability. In an embodiment, the power consumption may be interpreted as the estimated battery usage based on the number of re-transmissions required to maintain reliable communications in the wireless network. That is, the source node may estimate the number of re-transmissions needed to maintain a certain message completion rate or packet/bit error rate, or based on the interference level or signal-to-noise ratio, and evaluate the estimate against the level of remaining battery or detectability constraints.

At step 1230, the source node increments the hop count to 2, and re-broadcasts the transmission in a second timeslot that is subsequent to the first timeslot based on the evaluation of the trade-off between power consumption and communication reliability. At least one of the one-hop neighbors of the source node are able to receive (and successfully decode) the broadcast transmission in the first and/or second timeslots, increment the hop count, and then relay it in a subsequent timeslot as long as the hop count is less than or equal to the TTL field.

Nodes in the wireless network that implement the dsBMR protocol, according to an embodiment of the present invention, evaluate the trade-off between power consumption and communication reliability, and re-broadcast the transmission one more times to increase the probability of the relay nodes being able to successfully decode the broadcast transmission.

Figure 13:
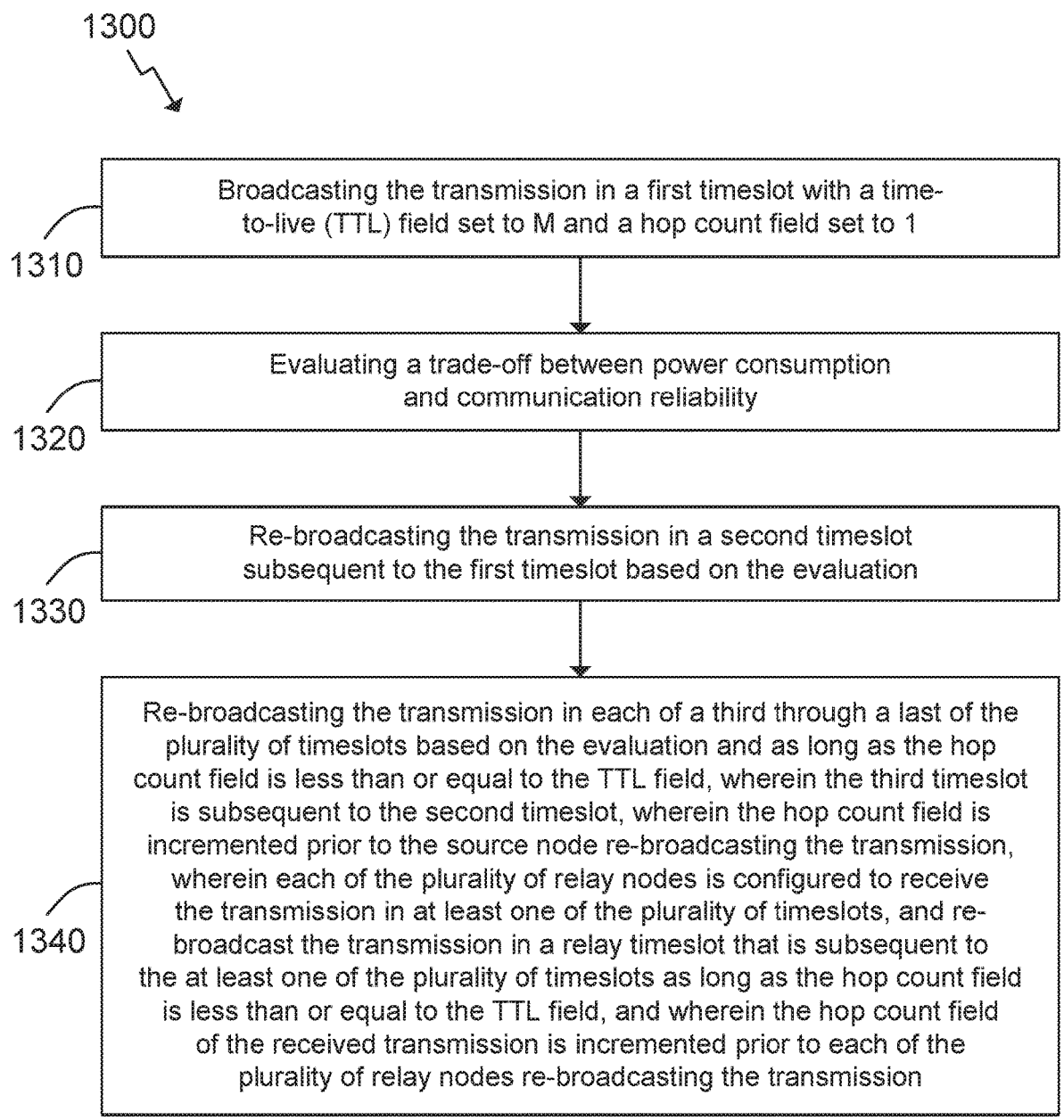
FIG. 13 is a flowchart for a method for the sBMR protocol, according to an embodiment of the present invention.

FIG. 13 is a flowchart for a method based on the source-recursive broadcast mechanism with re-transmissions (sBMR), according to an embodiment of the present invention. In some embodiments, the order of the steps may be changed. Furthermore, some of the steps in the flowchart may be skipped or additional steps added. This flowchart includes some steps that are similar to those shown in FIG. 12 and described above. At least some of these steps may not be separately described in this section.

Similar to the dsBMR protocol described in FIG. 12, at step 1330, the source node re-broadcasts the transmission (with the hop count field set to 2) in a second timeslot that is subsequent to the first timeslot based on the evaluation. However, the sBMR protocol adds an additional layer of redundancy in order to improve communication reliability at the expense of power consumption.

As step 1340, the source node re-broadcasts the transmission in each of a third through N-th timeslot based on the evaluation, with the hop count field being incremented prior to each re-broadcast. In scenarios where the first hop between the source node and its one-hop neighbors is fragile (either due to increased distance or increased interference levels), re-broadcasting the transmission in each available timeslot enables the source node to overcome the fragility of the first hop, and ensure that the transmission is disseminated network-wide.

Figure 14:
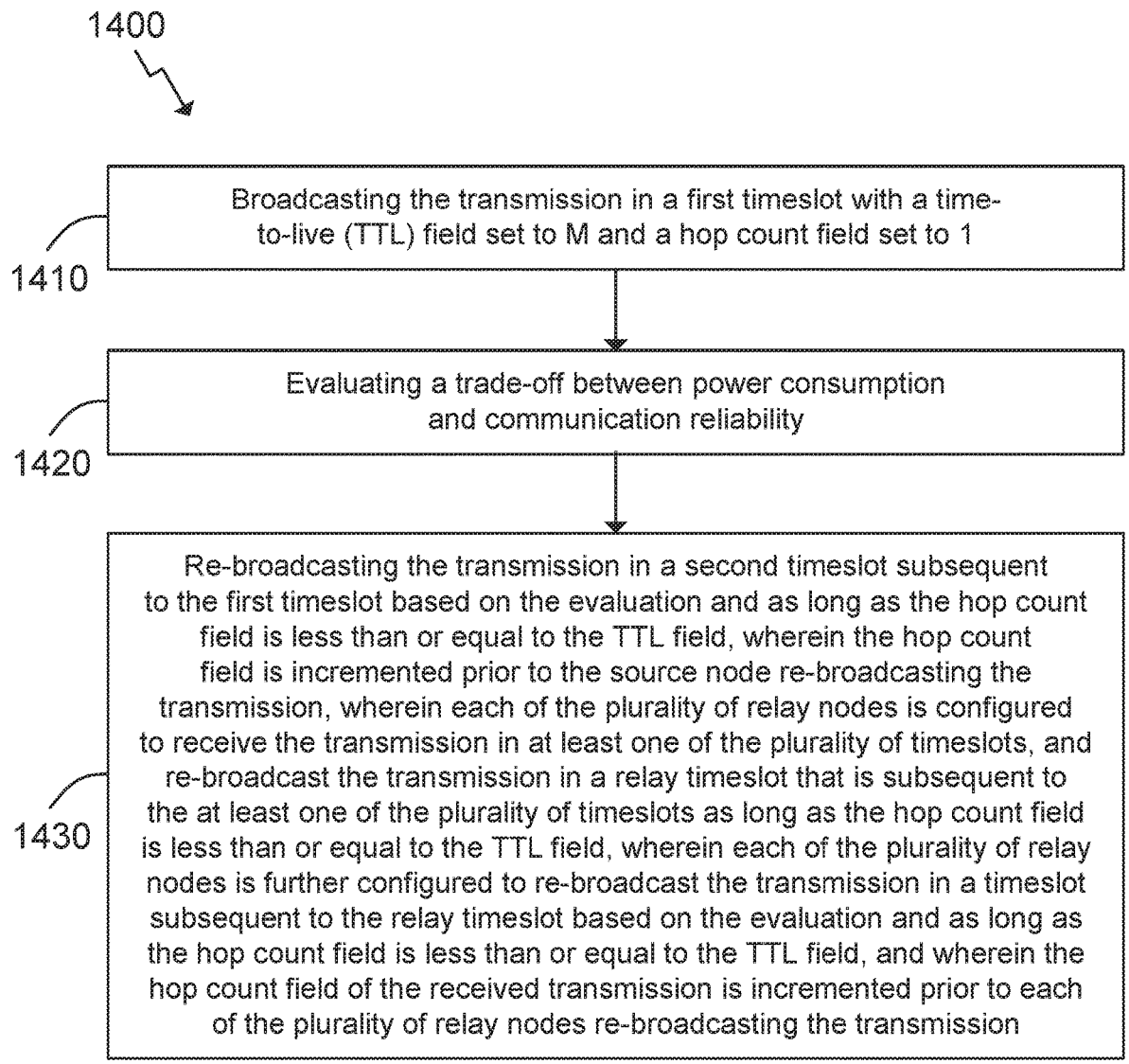
FIG. 14 is a flowchart for a method for the dBMR protocol, according to an embodiment of the present invention.

FIG. 14 is a flowchart for a method based on the double-transmit broadcast mechanism with re-transmissions (dBMR), according to an embodiment of the present invention. In some embodiments, the order of the steps may be changed. Furthermore, some of the steps in the flowchart may be skipped or additional steps added. This flowchart includes some steps that are similar to those shown in FIGS. 12 and 13, and described above. At least some of these steps may not be separately described in this section.

At step 1430, the source node and each relay node re-broadcasts the transmission, based on the evaluation, on a timeslot subsequent to the timeslot of the first transmission and the timeslot in which it was received, respectively. That is, in order to provide redundancy across each of the hops of the wireless network, the source node and each of the relay nodes broadcasts the transmissions in two consecutive timeslots, at the expense of increased power consumption.

In contrast to the dsBMR and sBMR protocols, which are directed towards increasing the redundancy of the first hop from the source node to its one-hop neighbors at the expense of increased power consumption, the dBMR protocol spreads the redundancy throughout the wireless network. In other words, the source node and each of the relay nodes is configured to re-broadcast the transmission in a second timeslot that is subsequent to the timeslot of the first transmission based on the evaluation.

Figure 15:
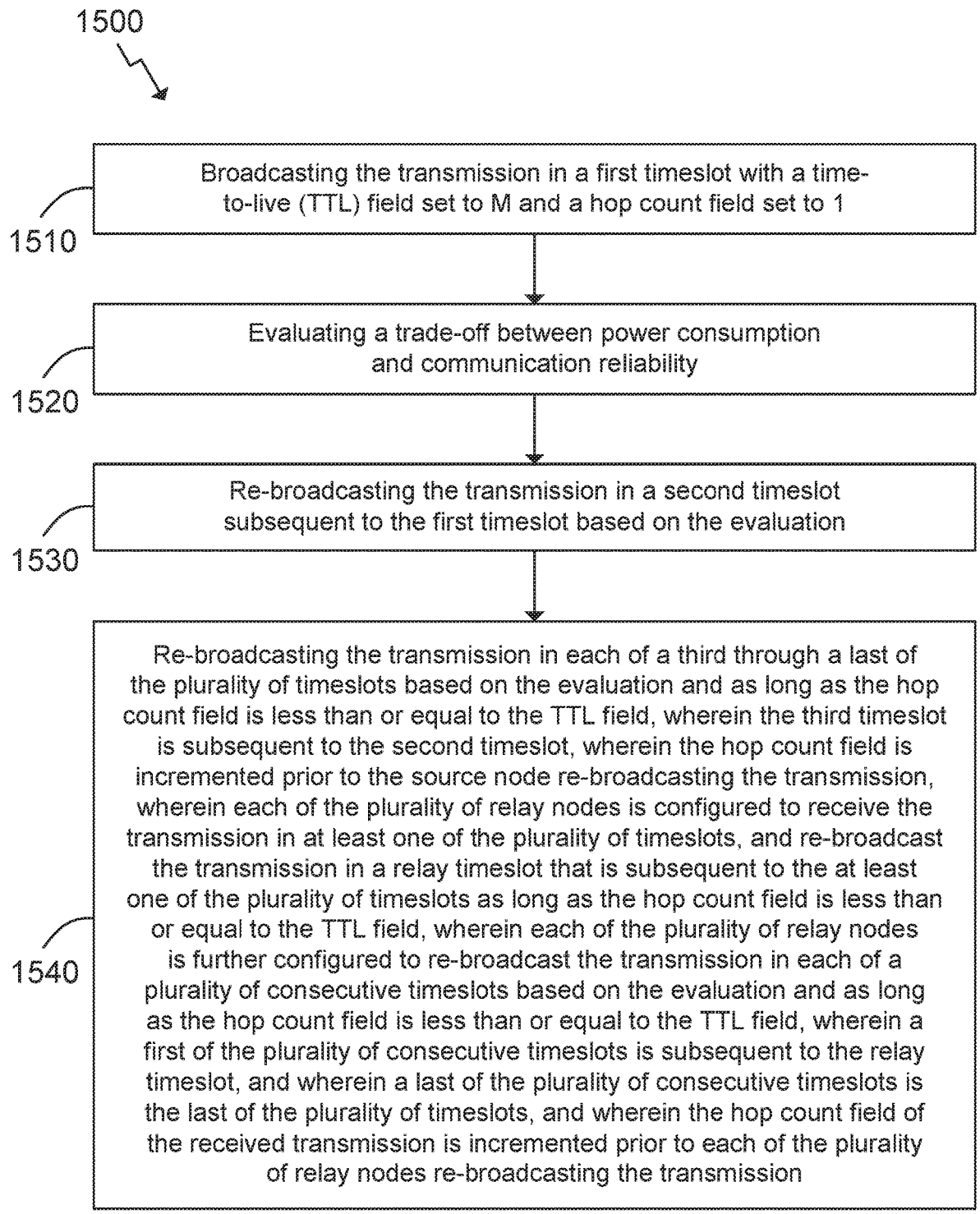
FIG. 15 is a flowchart for a method for the rBMR protocol, according to an embodiment of the present invention.

FIG. 15 is a flowchart for a method based on the recursive broadcast mechanism with re-transmissions (rBMR), according to an embodiment of the present invention. In some embodiments, the order of the steps may be changed. Furthermore, some of the steps in the flowchart may be skipped or additional steps added. This flowchart includes some steps that are similar to those shown in FIGS. 12, 13 and 14, and described above. At least some of these steps may not be separately described in this section.

At step 1530, the source node re-broadcasts the transmission, based on the evaluation, in a second timeslot that is subsequent to the first timeslot and increments the hop count field prior to re-broadcasting the transmission.

At step 1540, the source node re-broadcasts the transmission in each of a third through N-th timeslot based on the evaluation, and increments the hop count field prior to each re-broadcast. Furthermore, each of the relay nodes receive the transmission in a receive timeslot, and re-broadcast the transmission in each subsequent timeslot based on the evaluation. That is, a maximal amount of redundancy is used to ensure a greater level of communication reliability, but at the expense of significant power consumption since every node in the wireless network continues to re-broadcast the transmission in every available timeslot.

Figure 16:
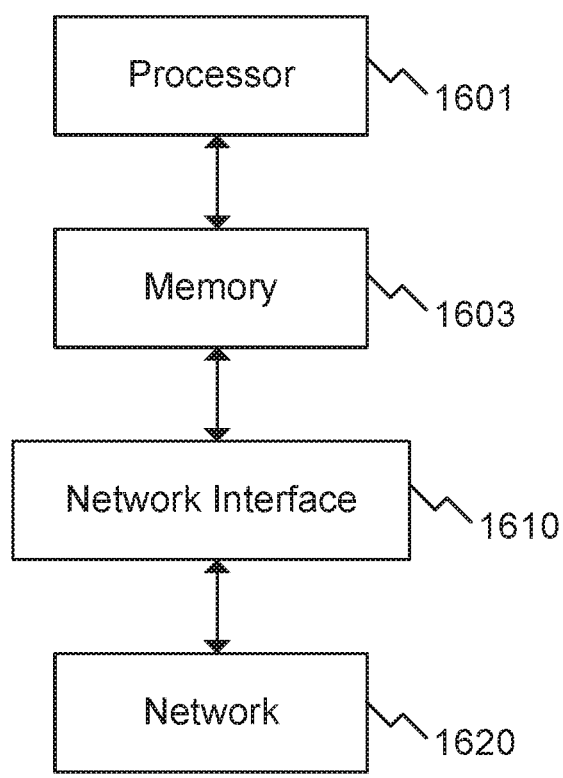
FIG. 16 is a block diagram of a device implemented as a node for reliable broadcasting using re-transmissions, according to an embodiment of the present invention.

FIG. 16 is a block diagram of a device implemented as a node for reliable broadcasting using re-transmissions in time-slotted wireless networks, according to an embodiment of the present invention. A shown in FIG. 16, the system comprises a processor 1601, a memory 1603, a network interface 1610, and a network 1620.

The processor 1601 shown in FIG. 12 may comprise component digital processors and may be configured to execute computer-executable program instructions stored in memory 1603. For example, the component digital processors may execute one or more computer programs in accordance with embodiments of the present invention.

Processor 1601 may comprise a variety of implementations for broadcasting or re-broadcasting a transmission, and evaluating a trade-off between power consumption and communication reliability, as well as a microprocessor, a digital signal processor (DSP), an application-specific integrated circuit (ASIC), one or more field programmable gate arrays (FPGAs), state machines, or the like. Processor 1601 may further comprise a programmable electronic device such as a programmable logic controller (PLC), a programmable interrupt controller (PIC), a programmable logic device (PLD), a programmable read-only memory (PROM), an electronically programmable read-only memory (EPROM or EEPROM), or another similar device.

Memory 1603 may comprise a non-transitory computer-readable medium that stores instructions which, when executed by the processor 1601, cause the processor 1601 to perform various steps, such as those described herein. Examples of computer-readable media include, but are not limited to, electronic, optical, magnetic, or other storage or transmission devices capable of providing the processor 1601 with computer-readable instructions. Other examples of computer-readable media comprise, but are not limited to, a floppy disk, CD-ROM, magnetic disk, memory chip, ROM, RAM, ASIC, configured processor, any optical medium, any magnetic tape or other magnetic medium, or any other medium from which a computer processor can access data. In addition, various other devices may include a computer-readable medium such as a router, private or public network, or other transmission device. The processor 1601 and the processing described may be in one or more structures, and may be dispersed throughout one or more structures.

Processor 1601 is in communication with the network interface 1610 via the memory 1603. The network interface 1610 may comprise one or more network connections. Network interface 1610 connects the processor 1601 and the memory 1601 to a network 1620. The network 1620 may be one of many types of networks known in the art. For example, network 1620 may comprise a wired or wireless network, and in an embodiment, may be a BRN.

Embodiments in accordance with aspects of the present subject matter can be implemented in digital electronic circuitry, computer hardware, firmware, software, or in combinations of the preceding. In one embodiment, a computer may comprise a processor or processors. A processor comprises or has access to a computer-readable medium, such as a random access memory (RAM) coupled to the processor.

While the present subject matter has been described in detail with respect to specific embodiments thereof, it will be appreciated that those skilled in the art, upon attaining an understanding of the foregoing, may readily produce modifications to, variations of, and equivalents to such embodiments. Accordingly, it should be understood that the present disclosure has been presented for purposes of example rather than limitation, and does not preclude inclusion of such modifications to, variations of and/or additions to the present subject matter as would be readily apparent to one of ordinary skill in the art.

What is claimed:

1. A method for reliable broadcasting in a wireless network comprising a source node and a plurality of relay nodes, the method implemented at the source node, comprising:
broadcasting a first transmission, comprising a time-to-live (TTL) a hop count field and a message, in a first timeslot of a plurality of timeslots;

generating an updated hop count field by incrementing the hop count field;

performing, based on characteristics of the source node, an evaluation of a trade-off between power consumption and communication reliability; and re-broadcasting, based on the evaluation and upon determining that the updated hop count field is less than or equal to the TTL field, a second transmission, comprising the TTL, the updated hop count field and the message, in a second timeslot of the plurality of timeslots that is subsequent to the first timeslot.

2. The method of claim 1, further comprising:

re-broadcasting the message in each of a third through a last of the plurality of timeslots based on the evaluation and as long as the hop count field is less than or equal to the TTL field, and wherein the third timeslot is subsequent to the second timeslot.

3. The method of claim 1, wherein the evaluation is based on at least one of a number of one-hop neighbors of a node in the wireless network, a plurality of link qualities between the node and its one-hop neighbors, previously collected packet error rate, bit error rate and message completion rate statistics, a type of the transmission, a priority of the transmission, or a state of the node, and wherein the state of the node is based on at least one of detectability constraints and a battery level.

4. The method of claim 1, wherein each of the plurality of relayed nodes is configured to receive the message in at least one of the plurality of timeslots, and re-broadcast the message in a relay timeslot that is subsequent to the at least one of the plurality of timeslots as long as the hop count field is less than or equal to the TTL field.

5. The method of claim 4, wherein each of the plurality of relayed nodes is further configured to re-broadcast the message in a timeslot subsequent to the relay timeslot, and as long as the hop count field is less than or equal to the TTL field.

6. The method of claim 4, wherein each of the plurality of relayed nodes is further configured to re-broadcast the message in each timeslot subsequent to the relay timeslot and within the plurality of timeslots, and as long as the hop count field is less than or equal to the TTL field.

7. The method of claim 1, wherein the wireless network is a barrage relay network.

8. A device for increasing reliability of broadcast transmissions in a wireless network comprising a source node and a plurality of relay nodes, the device comprising:

a processor; and a memory that comprises instructions stored thereupon, wherein the instructions when executed by the processor configure the processor to:

broadcast a first transmission, comprising a time-to-live (TTL) field, a hop count field and a message, in a first timeslot of a plurality of timeslots;

generate an updated hop count field by incrementing the hop count field;

perform, based on characteristics of the device, an evaluation of a trade-off between power consumption and communication reliability; and re-broadcast, based on the evaluation and upon determining that the updated hop count field is less than or equal to the TTL field, a second transmission, comprising the TTL, the updated hop count field and the message, in a second timeslot of the plurality of timeslots that is subsequent to the first timeslot.

9. The device of claim 8, wherein the instructions when executed by the processor further configure the processor to:

re-broadcast the message in each of a third through a last of the plurality of timeslots based on the evaluation and as long as the hop count field is less than or equal to the TTL field, and wherein the third timeslot is subsequent to the second timeslot.

10. The device of claim 8, wherein the evaluation is based on at least one of a number of one-hop neighbors of a node in the wireless network, a plurality of link qualities between the node and its one-hop neighbors, previously collected packet error rate, bit error rate and message completion rate statistics, a type of the transmission, a priority of the transmission, or a state of the node, and wherein the state of the node is based on at least one of detectability constraints and a battery level.

11. The device of claim 8, wherein each of the plurality of relayed nodes is configured to receive the message in at least one of the plurality of timeslots, and re-broadcast the message in a relay timeslot that is subsequent to the at least one of the plurality of timeslots as long as the hop count field is less than or equal to the TTL field.

12. The device of claim 11, wherein each of the plurality of relayed nodes is further configured to re-broadcast the message in a timeslot subsequent to the relay timeslot, and as long as the hop count field is less than or equal to the TTL field.

13. The device of claim 11, wherein each of the plurality of relayed nodes is further configured to re-broadcast the message in each timeslot subsequent to the relay timeslot and within the plurality of timeslots, and as long as the hop count field is less than or equal to the TTL field.

14. The device of claim 8, wherein the wireless network is a barrage relay network.

15. A system for reliable broadcasting in a wireless network, the system comprising:

a source node; and a plurality of relay nodes, wherein the source node is configured to:

broadcast a first transmission in a first timeslot of a plurality of timeslots;

determine a type of the first transmission; and re-broadcast, upon determining that the first transmission is of a first type and not of a second type, the first transmission in a second timeslot that is two timeslots after the first timeslot, wherein each of the plurality of relay nodes is configured to:

receive a second transmission in a third timeslot of the plurality of timeslots;

broadcast the second transmission in a fourth timeslot that is subsequent to the third timeslot;

determine the type of the second transmission; and re-broadcast, upon determining that the second transmission is of the first type and not of the second type, the second transmission in a fifth timeslot that is two timeslots after the fourth timeslot, and wherein a transmission of the first type comprises high-priority data and a transmission of the second type comprises standard-priority data.

16. The system of claim 15, wherein a priority of the transmission of the first type is higher than a priority of the transmission of the second type.

17. The system of claim 15, wherein the wireless network is a barrage relay network.

* * * * *